(12) United States Patent
Winistörfer et al.

(10) Patent No.: US 9,222,773 B2
(45) Date of Patent: Dec. 29, 2015

(54) GRADE MECHANISM FOR TILTABLE LASER OPTICAL SYSTEMS

(75) Inventors: Martin Winistörfer, Hinterforst (CH); Thomas Ammer, Widnau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 52 days.

(21) Appl. No.: 14/001,435

(22) PCT Filed: May 10, 2012

(86) PCT No.: PCT/EP2012/058655
§ 371 (c)(1),
(2), (4) Date: Aug. 23, 2013

(87) PCT Pub. No.: WO2012/152873
PCT Pub. Date: Nov. 15, 2012

(65) Prior Publication Data
US 2014/0047724 A1    Feb. 20, 2014

(30) Foreign Application Priority Data
May 11, 2011    (EP) .................................... 11165763

(51) Int. Cl.
*G01C 15/00*    (2006.01)
(52) U.S. Cl.
CPC ............ *G01C 15/008* (2013.01); *G01C 15/002* (2013.01); *G01C 15/004* (2013.01)
(58) Field of Classification Search
CPC ... G01C 15/002; G01C 15/004; G01C 15/008
USPC .............................. 33/227, 281, 282, 285, 286
See application file for complete search history.

(56) References Cited

U.S. PATENT DOCUMENTS

| | | |
|---|---|---|
| 5,485,266 A | 1/1996 | Hirano et al. |
| 6,262,801 B1 | 7/2001 | Shibuya et al. |
| 2008/0297921 A1* | 12/2008 | Kodaira ........................ 359/822 |

(Continued)

FOREIGN PATENT DOCUMENTS

| | | |
|---|---|---|
| CN | 1158161 A | 8/1997 |
| EP | 1 790 940 A2 | 5/2007 |

(Continued)

OTHER PUBLICATIONS

European Search Report dated Oct. 11, 2011 as received in Application No. EP 11 16 5763.

*Primary Examiner* — G. Bradley Bennett
(74) *Attorney, Agent, or Firm* — Maschoff Brennan

(57) ABSTRACT

Rotating construction laser device with a grade mechanism, including a code element and a position detection device for providing and detecting a feedback position information, and a leveling mechanism, which supports a lens barrel tiltably and is designed to tilt the lens barrel in order to have the level position detected by a tilt sensor and therewith to level the grade arm, the code element or the position detection device is arranged directly on the grade arm, and the feedback position information directly depends on the position of a reference point on the grade arm, the reference point being defined by the code element or the position detection device, respectively, thus allowing to deduce a position of the grade arm directly from the feedback position information, and/or to calculate a tilting angle of the grade arm with respect to the lens barrel directly from the feedback position information.

21 Claims, 8 Drawing Sheets

(56) References Cited

U.S. PATENT DOCUMENTS

| | | | | |
|---|---|---|---|---|
| 2010/0321673 | A1* | 12/2010 | Hayashi et al. | 356/139.1 |
| 2013/0160310 | A1* | 6/2013 | Dang | 33/286 |
| 2013/0276315 | A1* | 10/2013 | Kahle | 33/228 |
| 2014/0283399 | A1* | 9/2014 | Fessler et al. | 33/291 |
| 2014/0313521 | A1* | 10/2014 | Bridges | 356/614 |
| 2015/0015700 | A1* | 1/2015 | Becker et al. | 348/136 |

FOREIGN PATENT DOCUMENTS

| | | |
|---|---|---|
| EP | 1 901 034 A2 | 3/2008 |
| EP | 2 060 870 A2 | 5/2009 |
| EP | 2 327 958 A1 | 11/2009 |

* cited by examiner

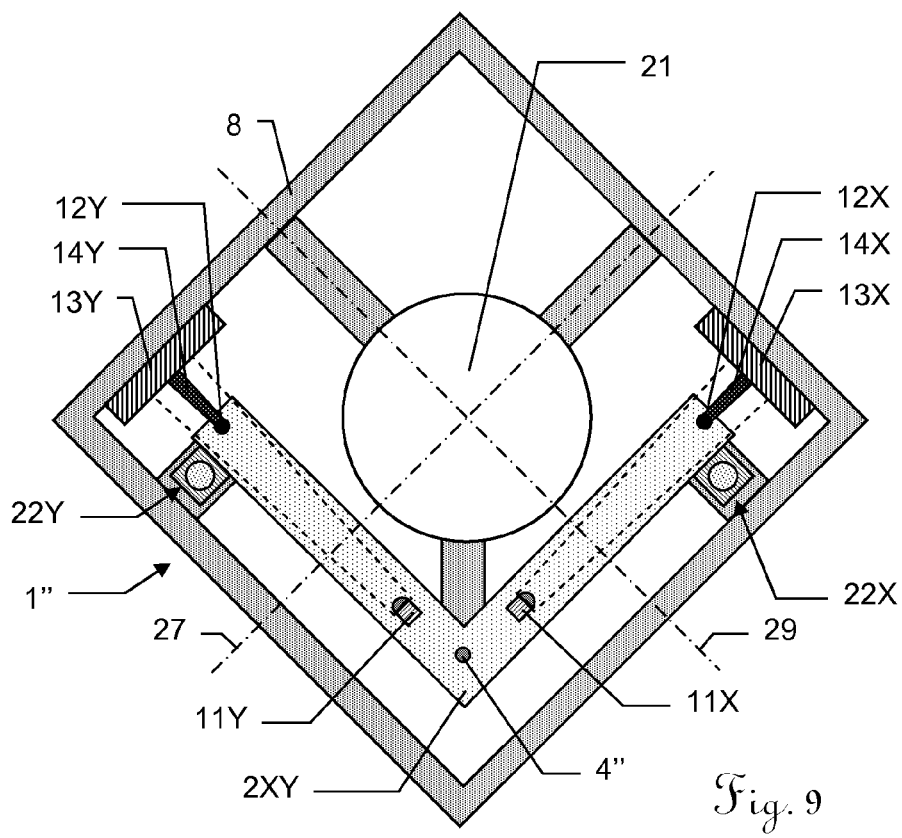
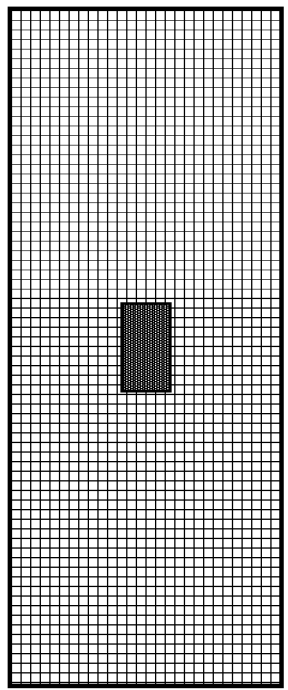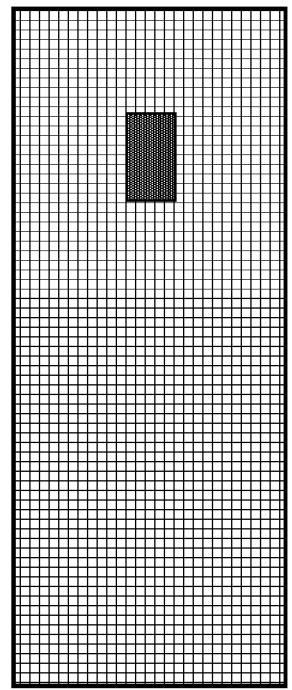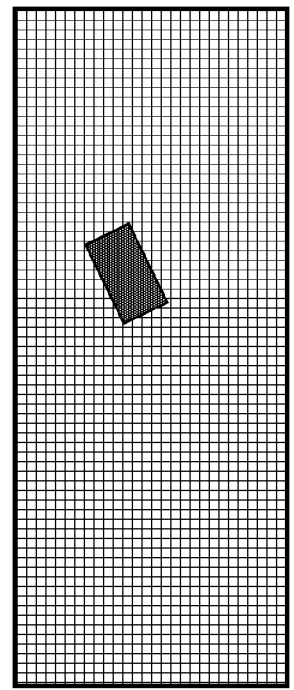
Fig. 10a      Fig. 10b      Fig. 10c

GRADE MECHANISM FOR TILTABLE LASER OPTICAL SYSTEMS

FIELD OF THE INVENTION

The present invention relates to a feedback sensor, in particular a home sensor, for a grade mechanism of a tiltable laser optical system, particularly of a tiltable rotating construction laser, and a method for determining a position of a grade arm of this grade mechanism.

BACKGROUND

Construction lasers with a rotatable laser beam are used primarily in the constructional industry as an auxiliary means for tracing horizontal and vertical lines on floors, ceilings and walls or to mark points or objects, to fix paths or reference lines, or to determine horizontal or vertical planes, or planes at defined inclinations on walls, ceilings and floors, which helps with the orientation or positioning along objects. Rotating construction lasers can be used, e.g. for aligning walls, windows or door frames and for the determination of the course of plumbing or electrical installations.

A conventional prior art rotational constructional laser comprises a laser unit located in a housing, an emitted laser beam of which being deflected by about 90° by a deflection device. The housing usually comprises optically transparent windows or cut-outs, which enable the laser to be emitted to the outside. The deflection device rotates about an axis that in general is coincident with the optical axis. Upon rotation of the deflection device, the laser beam, which, as a result of its deflection, propagates transverse to the rotational axis of the deflection device, describes a plane in such a way that a visible or detectable path or line is generated on a surface.

To enable an alignment of the path according to predefined or given settings the laser unit generally is mounted tiltably in two mutually perpendicular directions in relation to a housing that encloses the laser unit. It is well known from prior art that rotating construction lasers can be levelled with the help of a reference vial, in particular two orthogonally aligned reference vials, comprising sensor means for the determination of an absolute grade of the optical core module.

Conventionally, for controlling the grade of a rotating construction laser and its horizontal alignment a grade mechanism is used, which comprises a tilt sensor, e.g. a reference vial, that is mounted on a tiltable grade arm, respectively two orthogonally aligned tilt sensors on one grade arm or platform. Alternatively, the European patent application EP 09177262.4 describes the use of two tilt sensors on two orthogonally aligned grade arms.

In prior art there are various documents available that generally disclose a rotational laser, the inclination of which can be adjusted by a grade mechanism of this design—for instance the document U.S. Pat. No. 5,485,266. It is further known from this document that the tilting of the grade arm is run by a motor, in particular a stepper motor, which rotatably drives a lead screw that is connected with the grade arm by means of a nut. The grade mechanism employs an encoder, either in its lead screw mechanism to detect a rotation speed of the lead screw mechanism, or in its driving motor, which rotatably drives the lead screw. In case of a stepper motor the number of steps performed by the stepper motor corresponds to a certain change in the tilting angle of the grade arm. In order to be able to return the grade arm to the home position the number of steps performed by the stepper motor into a certain direction is counted and in particular memorized.

As a result of an accumulated error due to repetitive use of the lead screw mechanism, or a wear of a part of the mechanism due to repetitive use, or a deterioration of a part of the mechanism, errors can occur and cause general deviations in angle setting, so that tilting accuracy cannot be guaranteed any longer. Also, the stepper motor can lose count of the steps performed, e.g. if the device falls to the ground or through other circumstances receives a shock. As a consequence the grade mechanism would not be capable of returning the grade arm to the correct home position any longer. In following applications of the construction laser this would then lead to an incorrect inclination and would make a recalibration necessary.

With a feedback sensor that measures the tilt of the grade arm in at least one position, preferably the home position, it would always be possible to reference back to the original position. None of the solutions for rotational lasers of the above-mentioned prior art documents has a form of feedback-control that allows to confirm a set grade or to show an error or deviation. A feedback sensor of this type is already known from the European patent application EP 1 901 034 A2. This document discloses a feedback sensor system with a light emitting diode (LED) and a pattern plate that are mounted on the nut of the lead screw, together casting a light pattern onto an image reception surface of a charge-coupled device (CCD) array scanner mounted on the lens barrel. This solution, though, has some disadvantages: first of all there is still the possibility that the nut and particularly the connection of the nut with the grade arm might become imprecise. This, unfortunately, reduces the reliability of the feedback sensor. Another disadvantage arises from its complex, and therefore relatively pricey, setup with a pattern plate and a CCD.

SUMMARY

It is an object of the present invention to provide a high accuracy home and narrow range grade sensor system for a grade mechanism that precisely and reliably allows returning to the home position, in this manner also correcting for deviations occurring in the connection between the nut and the grade arm. Moreover, it is a particular object of the invention to provide this solution with simple means and at reduced production cost. At least one of these objects is achieved by the home sensor system.

A grade mechanism of a rotating construction laser according to an embodiment of the present invention includes: a lens barrel in which a laser optical system is disposed, a levelling mechanism which supports the lens barrel tiltably, a frame structure fixed to the lens barrel and provided with a grade arm and a tilting mechanism, which tilts the grade arm relative to a horizontal plane, a tilt sensor, which is provided at the grade arm and is configured to detect a preset reference position of the grade arm, and a feedback sensor system, which is configured to detect a position of the grade arm and/or to calculate a tilting angle based on the position of the grade arm.

The levelling mechanism, which supports the lens barrel tiltably, is designed to tilt the lens barrel so as to detect the reference position by the tilt sensor on the grade arm and then to level the grade arm by tilting the lens barrel.

The grade arm is tiltable in at least one of an XZ-plane and a YZ-plane, where the XZ-plane has an X-axis and a Z-axis, the YZ-plane has a Y-axis and a Z-axis, the Z-axis is, or coincides with, an optical axis of the laser optical system, and the X-axis and the Y-axis are perpendicular to each other in a plane perpendicular to the Z-axis. In case of a preferred embodiment with two grade arms, one grade arm is tiltable in an XZ-plane, and the other one in a YZ-plane.

The tilting mechanism comprises a lead screw, which is rotatably driven by a driving motor, and a nut, which is reciprocated by the lead screw and engages with the grade arm and tilts the grade arm relative to the reference position.

According to the feedback sensor system of the present invention, and in contrast to the solution of EP 1 901 034 A2, the light source and the shadow casting object are mounted directly on the grade arm and not on the nut, therefore the feedback sensor system according to the present invention also corrects for deviations caused by errors in the nut and its connection with the grade arm, which is important for overall instrument accuracy.

Although the inclination of a construction laser can actually be raised up to 25%, for a normal use situation it is sufficient to have highly precise feedback accuracy within a range of +/−4% of the grade setting. The feedback sensor according to the present invention is designed for that purpose. It is a highly efficient solution, as only very simple components are required, which in particularly is interesting for cost-effective production.

For the feedback sensor system of the present invention there is only a simple and low cost pin required, instead of an aperture with an absolute pattern plate as disclosed in EP 1 901 034 A2. Instead of a CCD array sensor a simple optical linear sensor is sufficient, as there are no complex patterns to be evaluated but only a simple shadow, the position of which easily can be recognized by a one-dimensional sensor. Additionally, with the use of a pin and a linear sensor, no complex calculations have to be implemented to evaluate an absolute light pattern. Thus, also a separate computing unit is dispensable. Moreover, there is no gluing process required for the pin as compared to other solutions with a plastic or glass disc encoder. The pin can be produced directly as a part of the grade arm component to reduce production costs, e.g. the grade arm and the pin could be produced as a single injection moulded part or an aluminium casting.

Alternatively, instead of a set-up with LED, pin and optical linear detector as feedback-sensor means, also other approaches are imaginable: For instance, a digital code and an encoder sensor can be used, one of them placed on the grade arm, and the other one on the frame structure, thus detecting an absolute position of the grade arm.

To further decrease production costs, the supporting bearing of the grade arm can be in the form of a "V-joint". The upper half of the bearing bushing, resting on two linear supports, is supported by a supporting pin and, like the shadow casting pin, can be produced as an integral part of the grade arm. This reduces the production costs of the single components and facilitates assembly. A lower part of the bearing bushing is attached to the bottom of the grade arm and prevents that the grade arm jumps off the supporting pin. The grade arm can also be shaped in such a way that there are more than one bearing bushings of this kind. Particularly, a version with two bearing bushings on both sides of the supporting pin can be useful. The lower part then has to be shaped accordingly to the shape of the grade arm, or there is one lower part for every bearing bushing.

Another advantage of the "V-joint" is enhanced repeatability, as, in contrast to a ball bearing, only two bearing parts—one inner and one outer bearing part—keep returning into the initial position. Because of two linear supports there is no geometrical over-determination as in the case of a bush bearing. Through free definition of the length of the sliding surfaces and the axial preloading the guidance can be controlled.

In a preferred embodiment of the invention the grade mechanism comprises two orthogonally aligned grade sensor devices with the home sensor according to the invention to measure the grade both in an X-axis and a Y-axis. The use of two independent grade arms, as described in the European patent application EP 09177262.4, circumvents the problems with inaccuracy arising from roll errors when a common grade arm with two tilt sensors is used. It is also possible to use only one single grade mechanism for this purpose. The grade mechanism then has to be mounted pivotably on the lens barrel. By being pivoted around the Z-axis, it can measure the grade sequentially in the two directions.

The grade mechanism of the present invention can also be used with a double grade arm, on which two tilt sensors are mounted measuring the tilt in an XZ-plane and a YZ-plane at the same time. In this case the use of optical array detectors, e.g. CCD array sensors, is advantageous in order to minimize or exclude roll errors, which occur when the double grade arm is supported by a single supporting pin and tilted independently by two tilting mechanisms. Thus, even if the grade arm is tilted only in the XZ-plane by one of the tilting mechanisms, also the position and inclination of the shadow casting object is changed. As this also affects the shadow that is cast by the shadow casting object, a linear detector eventually could detect only part of the shadow or no shadow at all. The array detector can detect a two-dimensional shadow silhouette of the shadow-casting object. In case of a cubical or cylindrical pin a rectangular shadow would be cast on the array detector. The array detector correctly detects the silhouette of the shadow, even if it is tilted due to the rolling of the grade arm, and can deduce a position of the shadow casting object.

It is even possible to use only one array detector for the determination of the tilt of the grade arm in both directions: The array detector then not only detects the position of the shadow but also its tilt and from the position of the shadow deduces a tilt of the grade arm in an XZ-plane and from the tilt of the shadow deduces a tilt of the grade arm in a YZ-plane.

An array detector can also be useful for embodiments with two independent grade arms. The array detector for instance can be used to detect lateral fluctuations—e.g. fluttering—of the shadow during the tilting process that could be due to a deterioration of the tilting mechanism. In this case a warning could be provided to the operator that maintenance service is needed.

BRIEF DESCRIPTION OF THE DRAWINGS

The invention in the following will be described in detail by referring to exemplary embodiments that are accompanied by figures, in which:

FIG. 9 shows a schematic representation of sixth embodiment the grade mechanism with a sensor system according to the invention having a double grade arm;

FIG. 10a-c show three schematic representations of an array sensor with a shadow;

DETAILED DESCRIPTION

Figure 1:
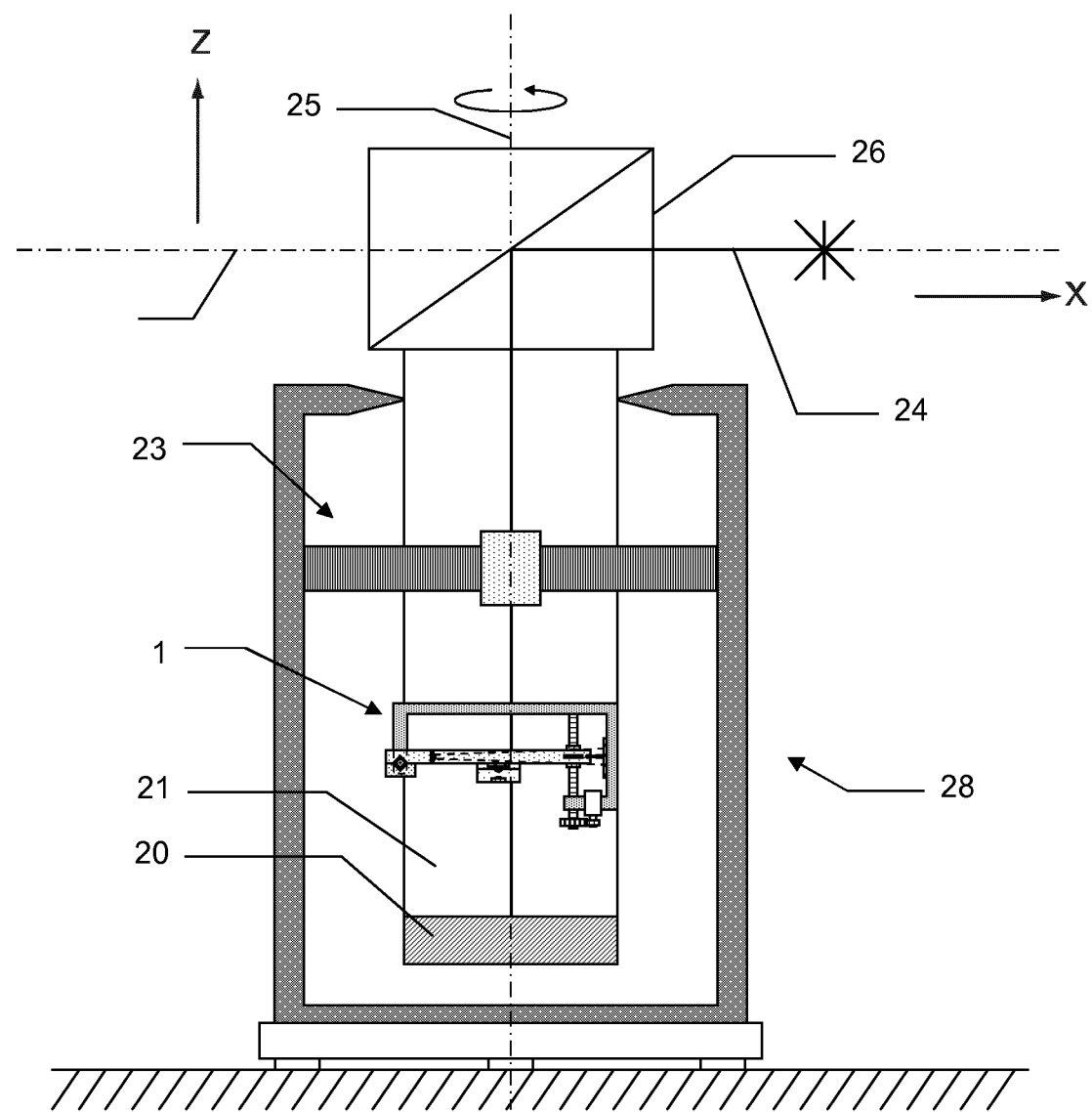
FIG. 1 shows a schematic representation of a tiltable rotational construction laser comprising a grade mechanism according to the invention.

FIG. 1 is a schematic representation of a tiltable rotating construction laser device 28 comprising the grade mechanism 1 according to the invention. The grade mechanism 1 is mounted on the lens barrel 21, which comprises a laser optical system 20 and is tiltably supported by the levelling mechanism 23. The laser optical system 20 emits a laser beam 24 in the direction of the optical axis 25. The laser beam 24 is deflected by about 90° by a deflection device 26, which rotates about the optical axis 25. Upon rotation of the deflection device 26, the laser beam 24, which, as a result of its deflection, propagates transverse to the rotational axis of the deflection device, describes a plane 27.

Figure 2A:
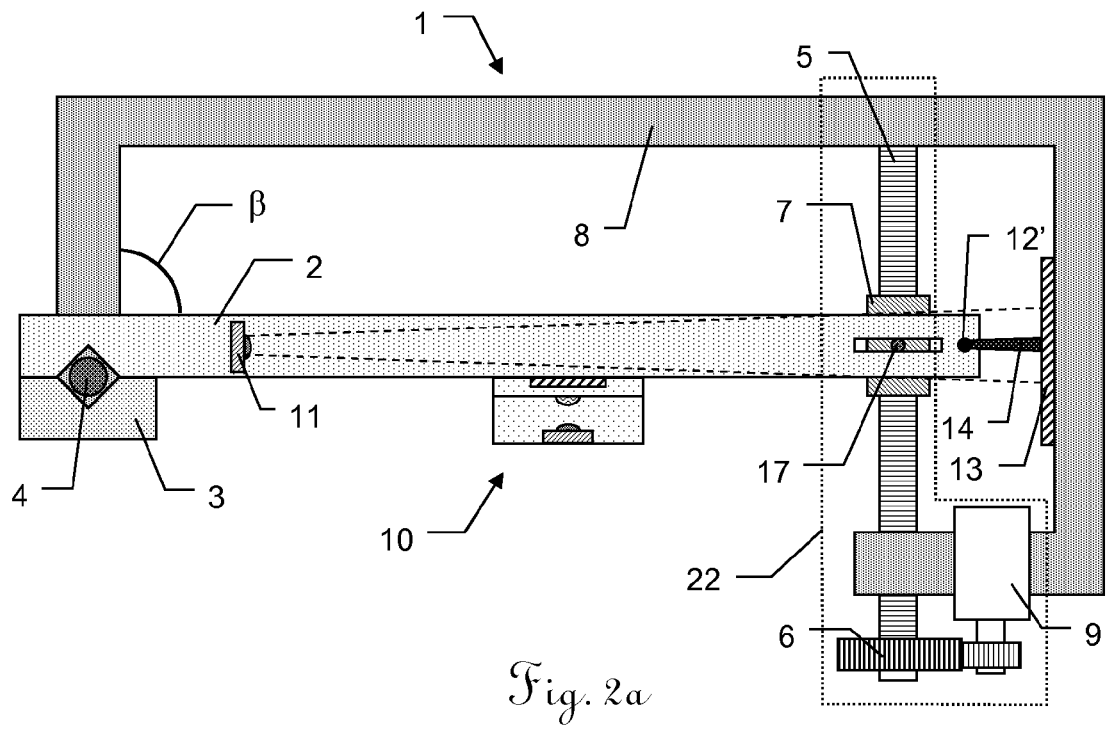
FIG. 2a shows a schematic representation of a first embodiment of the grade mechanism with a sensor system according to the invention.

FIG. 2a shows the grade mechanism 1 with the home sensor system according to the invention, comprising a frame structure 8, which is fixed to the lens barrel 21 of a laser optical system 20 (not illustrated), and a tilting mechanism 22, which is provided at the frame structure 8 and comprises a lead screw 5, a stepper motor 9 driving the lead screw 5 by means of a train of gears 6, and a nut 7, which is reciprocated by the lead screw 5. The grade mechanism 1 further comprises a grade arm 2, which is tiltably supported on the frame structure 8 and engages with the nut 7 of the tilting mechanism 22 by engagement means 17 of the nut 7. A tilt sensor 10 is fixed on the grade arm 2. In a home position the grade arm 2 is aligned in an output angle β with regard to the frame structure 8. In this schematic representation an exemplary output angle β of 90° is shown.

The home sensor system according to the invention is a feedback sensor for this grade mechanism 1 to achieve acceptable repeatability within +/−4% from the true level of the instrument, i.e. the home position of the grade arm 2. The home sensor system comprises an LED 11 (or an alternative light emitter) and a pin 12', which are mounted on the grade arm and aligned in such a way that a shadow 14 is cast from the pin to a home sensor 13, when the LED 11 emits a light towards the pin 12'. The home sensor 13 comprises an optical linear detector and is mounted on the cast structure 8.

The pin 12' is mounted on a reference point of the moveable grade arm 2 in such a way that in a home position of the grade arm 2 it is situated just in front of the centre of the home sensor 13. The LED 11 illuminates the pin 12', which consequently casts a shadow 14 onto the photosensitive surface of the optical linear detector. From the position of the shadow 14 on the surface of the linear detector a vertical position of the pin 12' can be calculated relative to the longitudinal axis of the home sensor 13. From the vertical position of the pin the absolute position of the grade mechanism, respectively the angle $β_1$ between the grade arm 2 and the frame structure 8, can be determined by the home sensor 13. Alternatively, a separate calculation unit 15 can be provided as an additional feature for this purpose.

Also multiple pins or other objects such as a simple hole can be used instead of the pin 12', as long as this object casts a shadow 14 that can be recognized by the optical linear detector of the home sensor 13 and from which a vertical position of this object can be deduced.

Figure 2B:
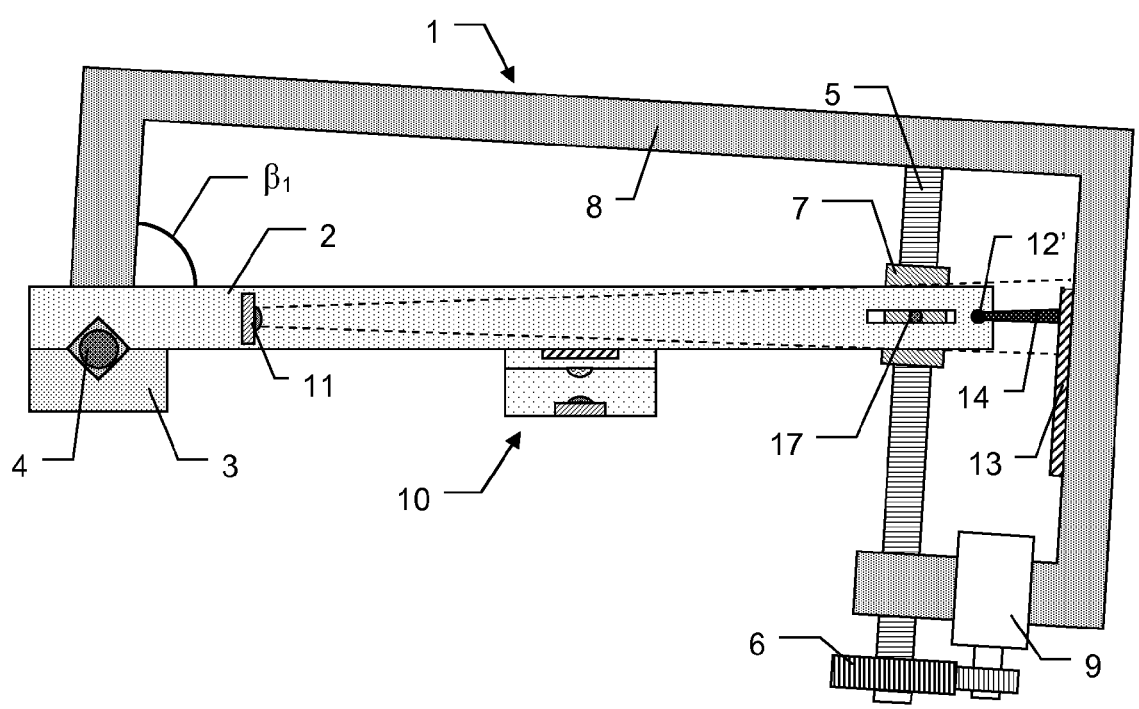
FIG. 2b shows a schematic representation of the embodiment of FIG. 2a in a tilted state.

FIG. 2b shows the same grade mechanism 1 for the case in which the laser plane generated by the rotating construction laser is levelled to a horizontal axis. After the tilting mechanism 22 had tilted the grade arm 2 upwards to an angle $β_1$, the tilt sensor 10 on the grade arm 2 reported a tilt that consequently was compensated by a tilt of the lens barrel 21 (not illustrated), to which the frame structure 8 is fixed, and the optical axis 25, until the tilt sensor 10 reported to be aligned horizontally again.

Figure 3:
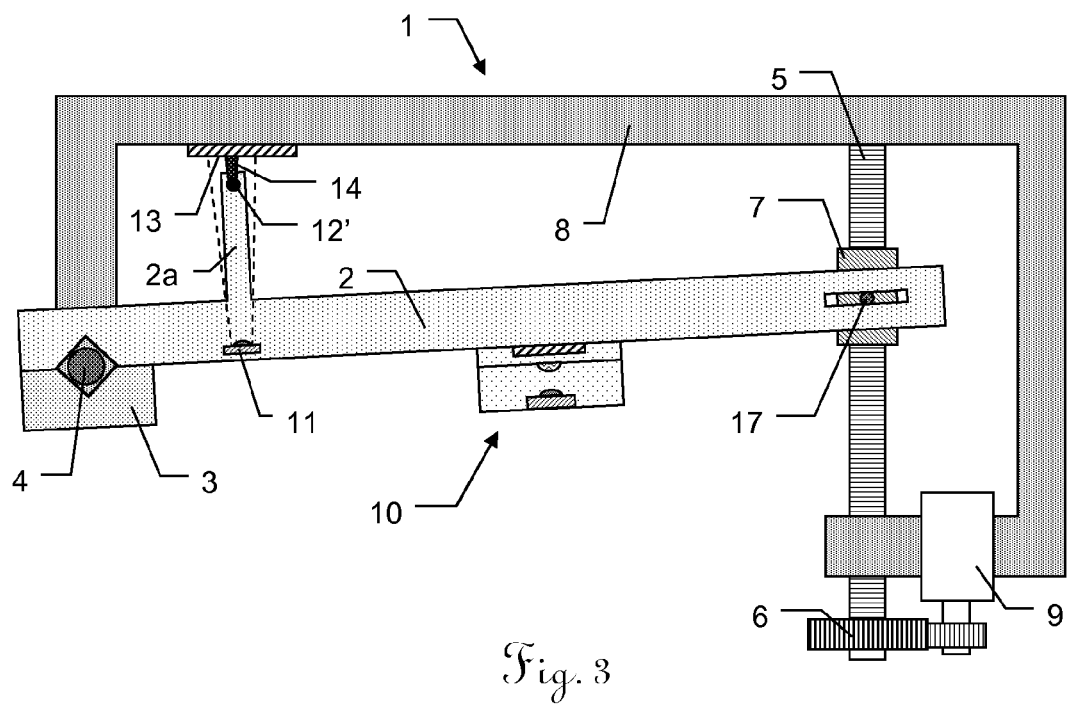
FIG. 3 shows a schematic representation of a second embodiment of the grade mechanism with a sensor system according to the invention.

In a second embodiment of the invention, which is illustrated in FIG. 3, the LED 11 emits light not in a direction parallel to the grade arm 2, but orthogonally to this. The shadow casting pin 12' is mounted on a lateral extension 2a of the grade arm 2 in such a way that a shadow 14 is cast on the surface of the optical linear detector of the home sensor 13, which is mounted on the frame structure 8. Theoretically, the light can be emitted in any direction that lies within the plane in which the grade arm 2 is tilted by the tilting mechanism 21. In FIG. 3 a situation is shown after the grade arm 2 has been tilted by the tilting mechanism 22, but before the levelling mechanism 23 subsequently has tilted the lens barrel 21 to level the grade arm 2.

Figure 4:
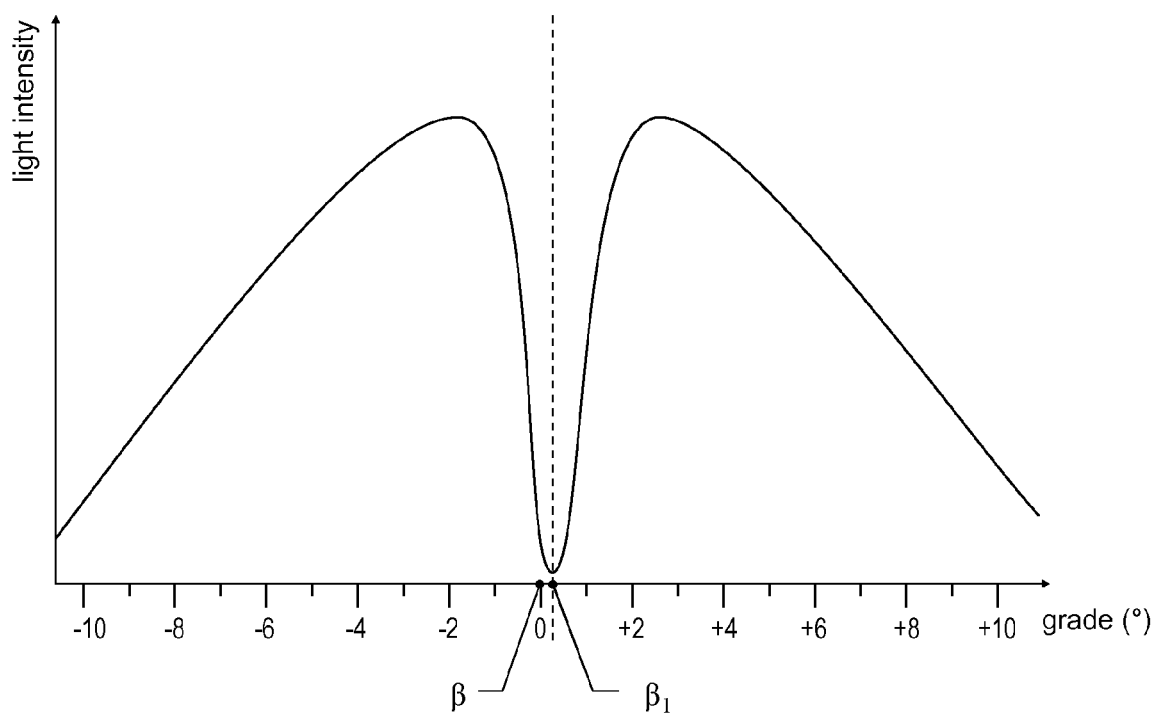
FIG. 4 shows a diagram of exemplary light intensity received by the optical linear sensor and the corresponding angle derived from these values.

FIG. 4 is a diagram, which illustrates the working principle of the optical linear detector of the home sensor 13. The detector measures the light intensity on its surface in a one-dimensional, linear resolution. The shadow 14 of the pin 12' results in a sudden decrease of light intensity in a certain area of the photosensitive surface of the detector. The local minimum value of light intensity corresponds to a vertical position of the pin 12' and an angle $β_1$ of the grade arm 2. When the grade arm 2 has been returned to its home position by the tilting mechanism 22 the angle $β_1$ should equal the predefined output angle β. Here, a difference of around 0.3° between the measured angle $β_1$ and the output angle β is shown. This difference can occur if the stepper motor 9 loses count of the steps performed, or a part of the tilting mechanism 22, e.g. the train of gears 6 or the nut 7 or the engagement means 17, have become imprecise from deterioration. The tilt of the grade arm 2 then can be corrected by the tilting mechanism 22 until the grade arm 2 reaches its true home position at the output angle β.

Figure 5A:
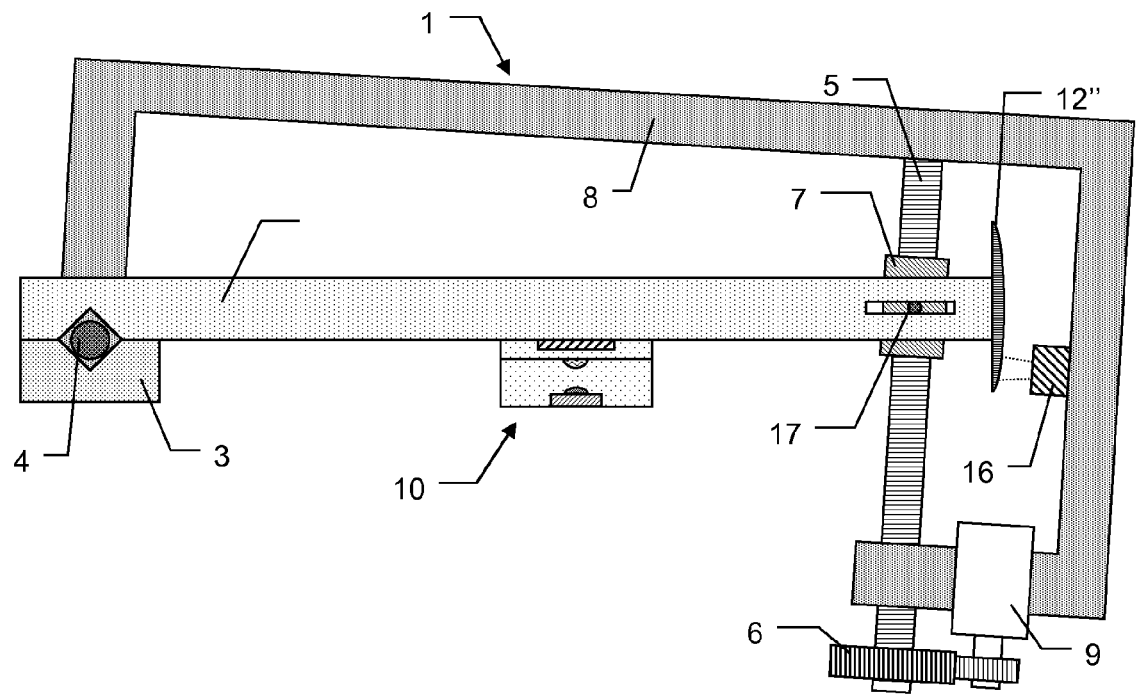
FIG. 5a shows a schematic representation of a third embodiment of the grade mechanism with a sensor system according to the invention with a digital code and an encoder sensor.
Figure 5B:
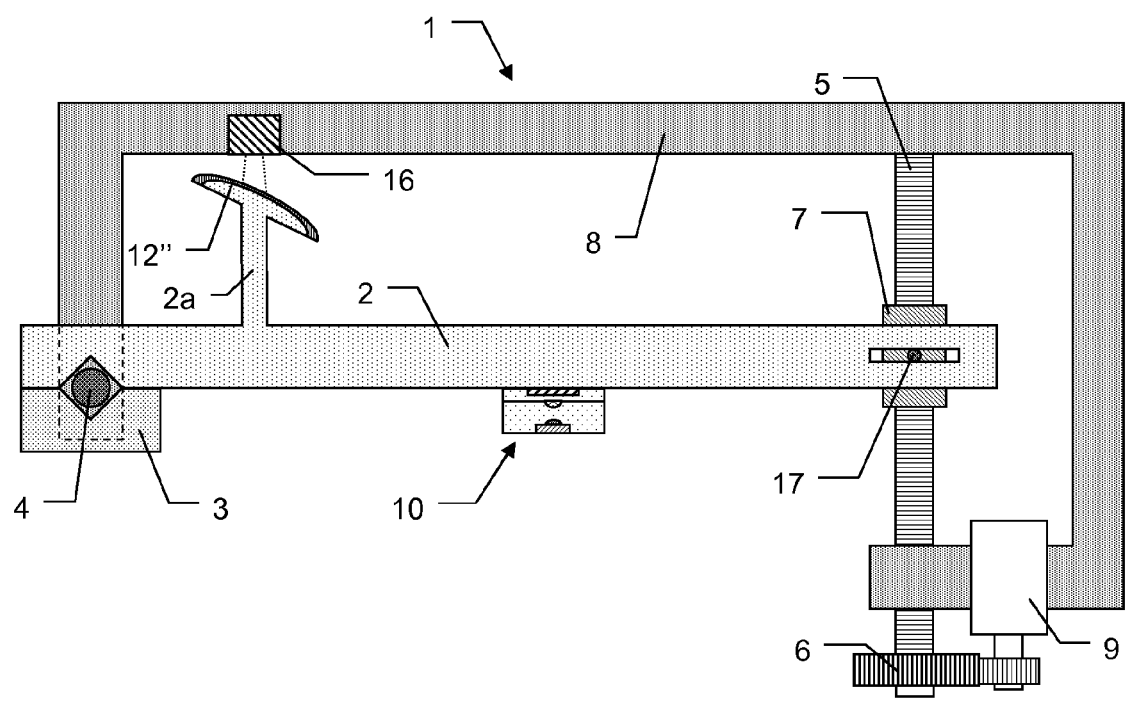
FIG. 5b shows a schematic representation of a fourth embodiment of the grade mechanism with a sensor system according to the invention with a digital code and an encoder sensor.

As illustrated in FIG. 5a, the home sensor system can also consist of or comprise a linear or rotary encoder with an encoder sensor 16 that is mounted on the frame structure and designed for scanning a digital code 12" on the surface of an angular or linear scale that is mounted on the grade arm 2. The digital code 12" contains the encoded absolute position of the grade arm 2 and can be provided by various means, such as optical, magnetic, inductive or capacitive means. The encoder sensor 16 detects a part of the code 12" and from this part deduces an absolute position of the grade arm 2. The encoder can also be placed on a lateral extension 2a of the grade arm 2, as shown in FIG. 5b.

Figure 6:
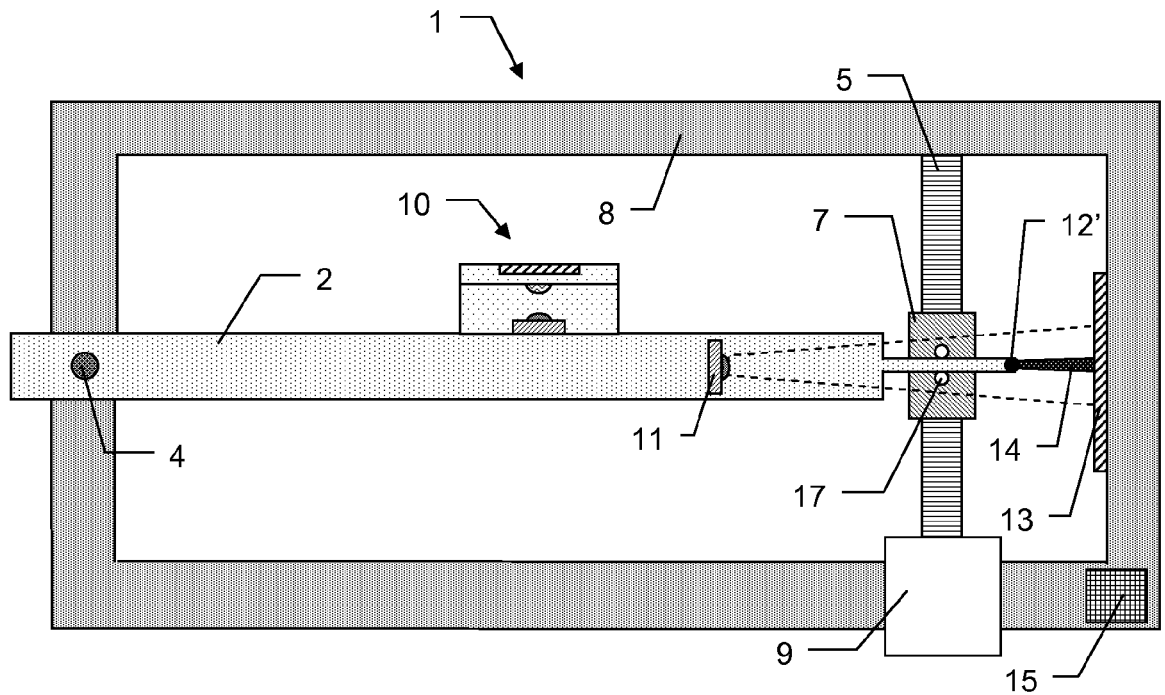
FIG. 6 shows a schematic representation of a fifth embodiment of the sensor system according to the invention.

A further exemplary embodiment of the grade mechanism 1, having certain distinct feature designs but in general the same working principle as the embodiments described above, is illustrated in FIG. 6. As shown here, it is also possible that a separate calculation unit 15 is provided, the motor 9 can drive the lead screw 5 without a gear ratio adaptation by a train of gears 6, the position of LED 11 and shadow casting pin 12' may vary as well as the design of the tiltable support 4 on the frame structure 8. Also, there are different designs of the engagement means 17 for the engagement of the nut 7 and the grade arm 2 thinkable.

Figure 7:
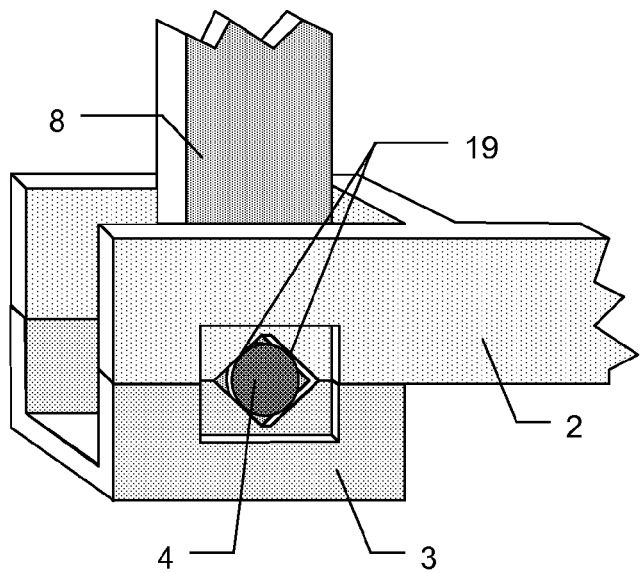
FIG. 7 shows a schematic representation of a V-joint for the tiltably supporting the grade arm on the frame structure.

FIG. 7 shows an embodiment of the end of the grade arm 2 that is supported tiltably on the frame structure 8 with a V-shaped joint. The tiltable support 4, which holds the end of the grade arm 2, here is a simple pin, particularly made of steel. At this end the grade arm 2 has a lower part 3, which is attached to the grade arm. Both the grade arm 2 and the lower part 3 have a V-shaped notch. When the grade arm 2 and the lower part 3 are put together, these V-shaped notches form a common opening. Thus, the grade arm 2, respectively the upper half of the bearing bushing, rests on the supporting pin 4 by two linear supports 19. The lower part 3, respectively the lower half of the bearing bushing, prevents that the grade arm 2 jumps off the supporting pin 4. Here, an embodiment with two bearing bushings and one supporting pin 4 is illustrated, but there are also various alternative embodiments with one or more than two bearing bushings and more than one supporting pin 4 thinkable.

Figure 8:
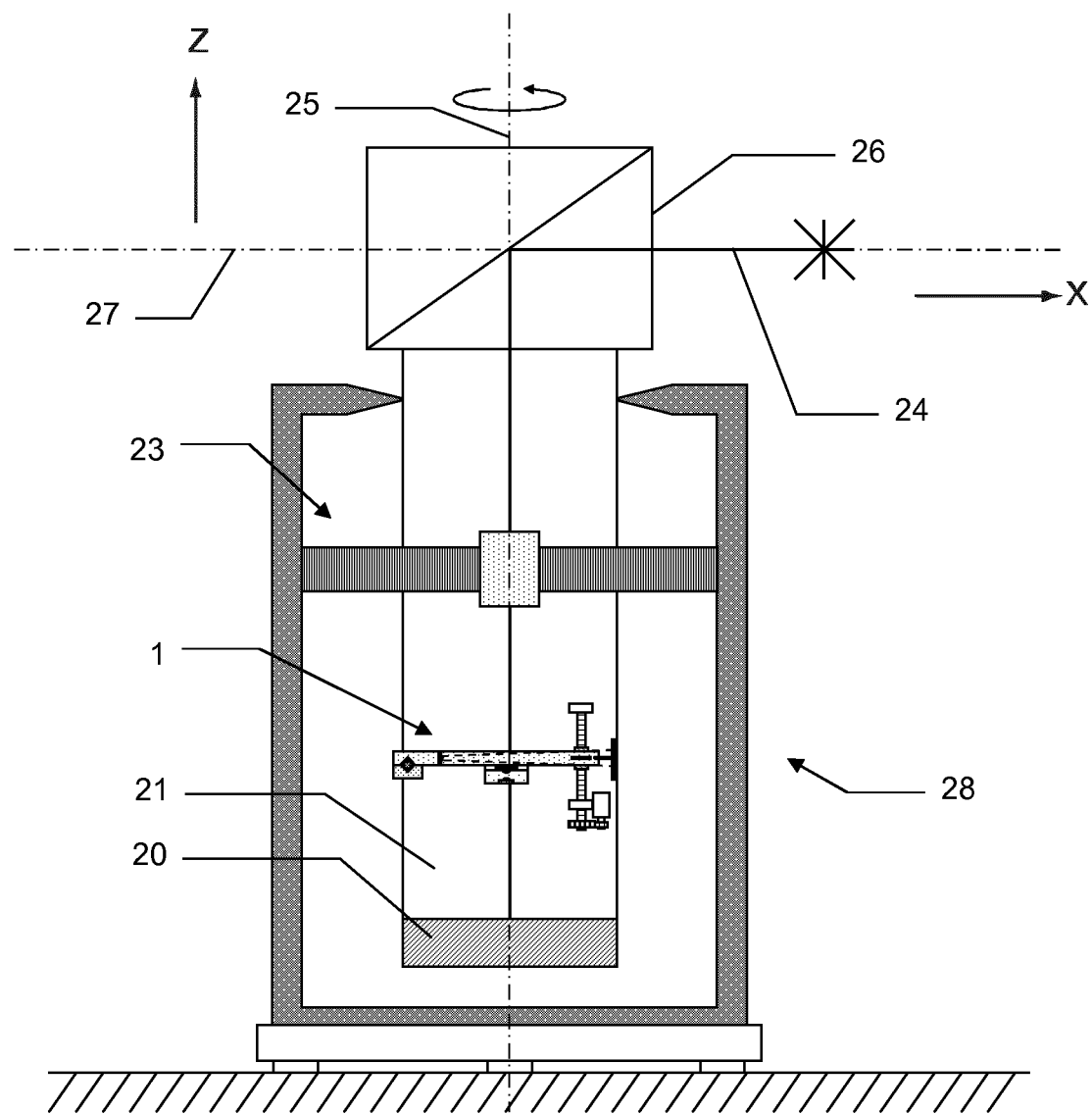
FIG. 8 shows a schematic representation of the rotational construction laser of FIG. 1 without a frame structure, the components of the grade mechanism being mounted directly on the lens barrel.

The frame structure 8 of the grade mechanism 1 can be mounted to the lens barrel 21 in various ways, e.g. it can be glued or bolted to the surface of the lens barrel 21. It also can be produced as an integral part of this. In another alternative embodiment, the frame structure 8 of the grade mechanism 1 is totally dispensable. This is shown in FIG. 8. All components of the grade mechanism 1 that in the embodiments described above are mounted to the frame structure 8 can also be mounted directly to the lens barrel 21. The lens barrel 21 could also be produced in such a way that its surface comprises the necessary mountings for these components.

FIG. 9 schematically shows a sixth embodiment of the invention in a top view. In this embodiment a grade mechanism 1" with a double grade arm 2XY is used. Of the grade arm 2XY one part is aligned in the direction of the X-axis 27 and the other in the direction of the Y-axis 29. Both parts of the grade arm 2XY each have the features of the first embodiment: a light emitter 11X/11Y, a shadow casting object 12X/12Y and a tilt sensor 10X/10Y (not shown). The double grade arm 2XY is supported by a pin 4" and can be tilted in an XZ-plane by a first tilting mechanism 22X and in a YZ-plane by a second tilting mechanism 22Y.

With this grade mechanism 1" it is possible to measure the tilt of the grade arm 2XY relative to the X-axis 27 and the Y-axis 29 at the same time. In FIG. 9 the sensor means to receive and detect the shadows 14X/14Y cast by the shadow casting objects 12X/12Y are area array detectors 13X/13Y, which detect the shadows 14X/14Y two-dimensionally.

FIGS. 10a, 10b and 10c schematically show the surface of an array detector 13X with a representation of a rectangular shadow 14X. In FIG. 10a the position of the shadow 14X represents the home position of the grade arm 2XY in the XZ-plane, e.g. a tilting angle β of 0°. As the shadow 14X stands upright, there is also no tilt in the YZ-plane. In FIG. 10b the position of the shadow 14X is elevated. This position represents an upward tilt of the grade arm 2XY in the XZ-plane. Also in this figure the shadow 14X stands upright, showing that there is no tilt in the YZ-plane with respect to the Y-axis 29. In FIG. 10c the shadow 14X is tilted to the left, which indicates a rolling of the grade arm 2XY due to a downward tilt in the YZ-plane.

As the vertical position of the shadow 14X represents a tilt of the grade arm in the XZ-plane, and from the tilt of the shadow 14X a tilt of the grade arm 2XY in the YZ-plane can be deduced, it is also possible to use only a single array detector 13X for the detection of the home position in both directions.

Figure 11:
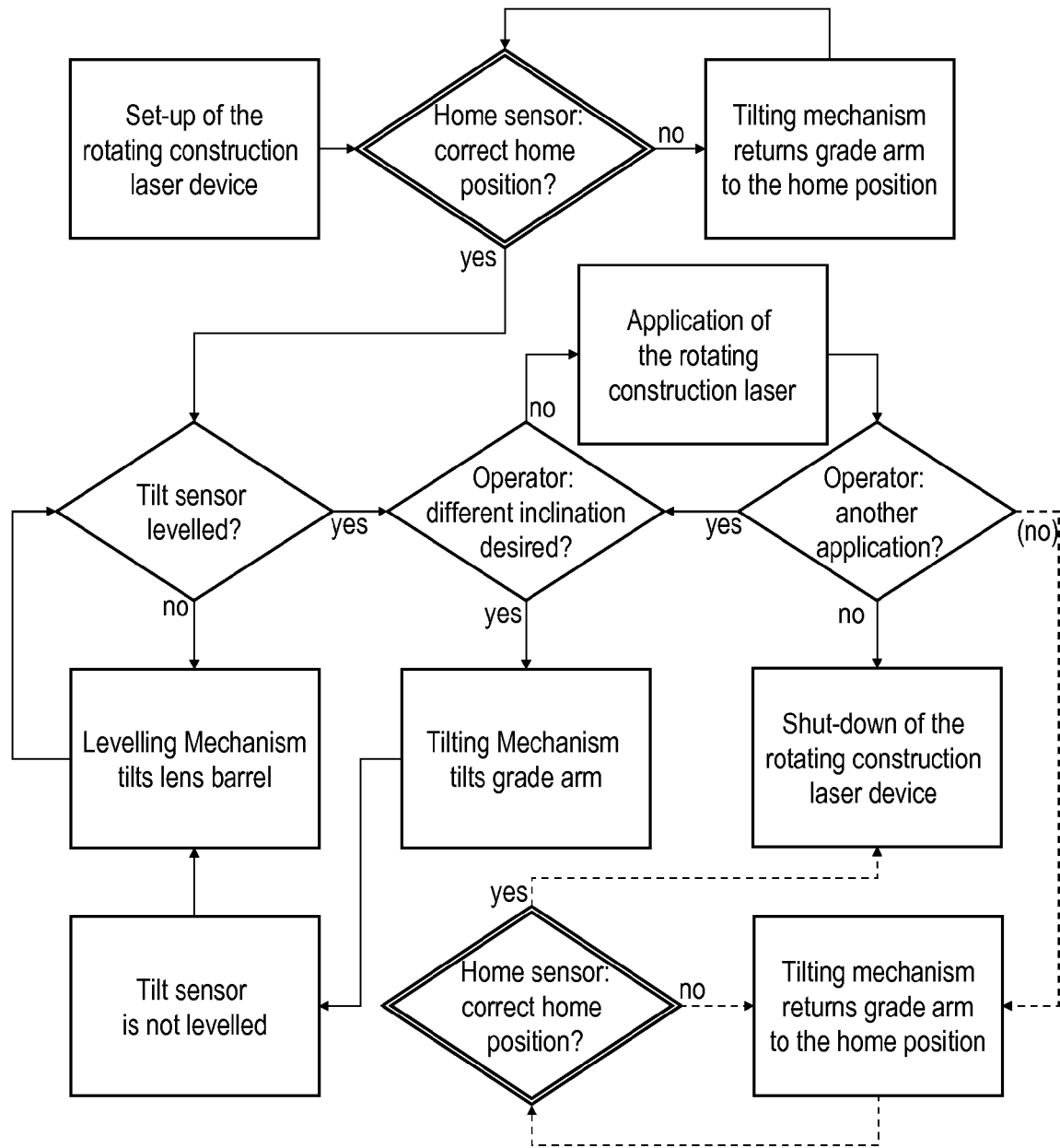
FIG. 11 shows a flow diagram that schematically illustrates the working principle of the cooperation between the tilt sensor, the levelling mechanism, the grade mechanism and the home sensor system.

In FIG. 11 a flow diagram is shown that schematically illustrates the working principle of the interaction of the tilt sensor 10, the levelling mechanism 23, the tilting mechanism 22 and the home sensor system: When the rotating construction laser device is set-up and switched on, and the operator inputs that a horizontal plane shall be projected, the home sensor verifies whether the position of the grade arm 2 is the home position. In case that there is a deviation, the tilting mechanism 22 readjusts the tilt of the grade arm 2 until the home sensor verifies that the grade arm 2 has reached its home position. If the grade arm 2 is in its home position the levelling mechanism 23 levels the lens barrel 21 according to information provided by the tilt sensor 10 on the grade arm 2.

When the operator of the device selects an inclination grade the tilting mechanism 22 tilts the grade arm 2 accordingly, e.g. by counting steps of the stepper motor 9. As the tilt sensor 10 is mounted on the grade arm 2, it is then no longer levelled. Thus, the levelling mechanism 23 tilts the lens barrel 21 until the grade arm 2 and the tilt sensor 10 are levelled again. The lens barrel 21 and the laser plane generated by the rotating construction laser then have the desired inclination. This is repeated as long as the operator selects a different inclination and until the device is switched off.

Optionally, after the use of the device the tilting mechanism 22 returns the grade arm 2 to the (assumed) home position, and the home sensor verifies whether the position of the grade arm 2 is the home position. This option in FIG. 9 is represented by broken lines. It is advantageous especially in the case that the tilt of the grade arm 2 exceeds the perception angle of the home sensor.

An optional additional function of the home sensor is the possibility to verify any tilting angle $\beta_1$ of the grade arm 2 within a range that is perceptible by the sensor means. The range depends on the dimensions of the linear or array detector and should reach at least 4°, in particular at least 10°, in both directions.

Although the invention is illustrated above, partly with reference to some preferred embodiments, it must be understood that numerous modifications and combinations of different features of the embodiments can be made. All of these modifications lie within the scope of the appended claims.

What is claimed is:

1. A rotating construction laser device with a grade mechanism, comprising:
   a lens barrel in which a laser optical system is disposed;
   a frame structure that is fixed to, integrated into or directly provided by a part of the structure of the lens barrel;
   a grade arm, which is tiltably supported on the frame structure in an XZ-plane, the XZ-plane having an X-axis and a Z-axis, the Z-axis being an optical axis of the laser optical system and the X-axis lying within a plane perpendicular to the Z-axis;
   a tilt sensor which is provided at the grade arm and is configured to detect a level position of the grade arm;
   a tilting mechanism, which is provided on the frame structure and is designed to tilt the grade arm relative to the XZ-plane;

a code element for providing a feedback position information and a position detection device for detecting the feedback position information; and a leveling mechanism, which supports the lens barrel tiltably and is designed to tilt the lens barrel in order to have the level position detected by the tilt sensor and therewith to level the grade arm, wherein:

the code element or the position detection device is arranged directly on the grade arm, and the feedback position information directly depends on the position of a reference point on the grade arm, the reference point being defined by the code element or the position detection device, respectively, thus allowing to:

deduce a position of the grade arm directly from the feedback position information; and/or calculate a tilting angle of the grade arm with respect to the lens barrel directly from the feedback position information.

2. A rotating construction laser device according to claim 1, wherein the code element is a shadow casting object, in particular a pin, a multitude of pins or a hole, the grade arm and the shadow casting object in particular being produced as a common work piece.

3. A rotating construction laser device according to claim 1, wherein the code element is a pin, a multitude of pins or a hole, the grade arm and the shadow casting being produced as a common work piece.

4. A rotating construction laser device according to claim 3, wherein the shadow casting being produced as a common work piece.

5. A rotating construction laser device according to claim 2, wherein a light emitter and the shadow casting object are mounted on the grade arm, the shadow casting object being positioned on the reference point;

an optical linear detector is configured to receive the shadow of the shadow casting object in order to detect a position of the shadow casting object; and the position detection device is configured to deduce a position of the grade arm from the position of the shadow casting object and/or to calculate a tilting angle between the grade arm and the optical axis based on the position of the shadow casting object.

6. A rotating construction laser device according to claim 5, wherein the light emitter comprises a light emitting diode.

7. A rotating construction laser device according to claim 1, wherein the code element is an encoder having a digital code providing the feedback position information.

8. A rotating construction laser device according to claim 7, wherein the digital code comprises the encoded absolute position of the grade arm or of the reference point on the grade arm; and an encoder sensor is provided that is designed to detect at least a part of the digital code and to deduce a position of the grade arm from the detected part of the digital code.

9. A rotating construction laser device according to claim 1, wherein the position detection device is configured to determine:

the position of the reference point relative to a preset home position; and/or the angle between the grade arm and the optical axis relative to a preset angle.

10. A rotating construction laser device according to claim 1, wherein the position detection device is configured to detect a position of a reference point on the grade arm within an angular range of at least 4° above and below a preset home position of the reference point on the grade arm.

11. A rotating construction laser device according to claim 1, wherein the tilting mechanism comprises:

a lead screw, which is rotatably driven by a driving motor; and a nut, which is reciprocated by the lead screw and engages with the grade arm by engagement means and tilts the grade arm.

12. A rotating construction laser device according to claim 1, wherein the tilting mechanism comprises:

a lead screw, which is rotatably driven by a stepper motor; and a nut, which is reciprocated by the lead screw and engages with the grade arm by engagement means and tilts the grade arm.

13. A rotating construction laser device according to claim 1, wherein the grade arm is tiltably supported on the frame structure in such a way that a bearing component is attached to the grade arm, the grade arm and the bearing component being shaped in such a way that they together form at least one bearing bushing, which is tiltably supported on a cylindrical pin by two linear supports.

14. A rotating construction laser device according to claim 1, wherein at least two grade mechanisms.

15. A rotating construction laser device according to claim 1, wherein at least two grade mechanisms, the at least two grade arms being aligned in a right angle in a plane perpendicular to the optical axis.

16. A rotating construction laser device according to claim 1, wherein:

the grade mechanism is mounted pivotably around the optical axis, particularly in an angle of at least 90°, or a double grade arm is tilted by two tilting mechanisms and has two orthogonally aligned tilt sensors.

17. A rotating construction laser device according to claim 1, wherein the frame structure is incorporated into the lens barrel in such a way that:

the grade arm is tiltably supported on the lens barrel, and the tilting mechanism is provided on the lens barrel.

18. A method for determining a position of a grade arm of a grade mechanism of a rotating construction laser device, the rotating construction laser device comprising:

a lens barrel in which a laser optical system is disposed;

a frame structure that is fixed to, integrated into or directly provided by a part of the structure of the lens barrel;

a grade arm, which is tiltably supported on the frame structure in an XZ-plane, the XZ-plane having an X-axis and a Z-axis, the Z-axis being an optical axis of the laser optical system and the X-axis lying within a plane perpendicular to the Z-axis;

a tilt sensor which is provided at the grade arm and is configured to detect a level position of the grade arm;

a tilting mechanism, which is provided on the frame structure and is designed to tilt the grade arm relative to the XZ-plane;

a code element for providing a feedback position information and a position detection device for detecting the feedback position information; and a leveling mechanism, which supports the lens barrel tiltably and is designed to tilt the lens barrel in order to have the level position detected by the tilt sensor and therewith to level the grade arm, wherein the method includes:

detecting the feedback position information, which directly depends on the position of a reference point on the grade arm the reference point being defined by the code element or the position detection device, respectively; and deducing a position of the grade arm based on the feedback position information and/or calculating a tilting angle of the grade arm with respect to the lens barrel based on the position of the reference point.

19. A method according to claim 18, further including determining:

the position of the reference point relative to a preset home position; and/or the angle between the grade arm and the optical axis relative to a preset angle.

20. A method according to claim 18, further including detecting a position of the reference point on the grade arm within an angular range of at least 4° above and below a preset home position of the reference point on the grade arm, in particular at least 10°.

21. A rotating construction laser device according to claim 5, wherein the detected position of the shadow casting object is a vertical position.

* * * * *